Patented Aug. 19, 1924.

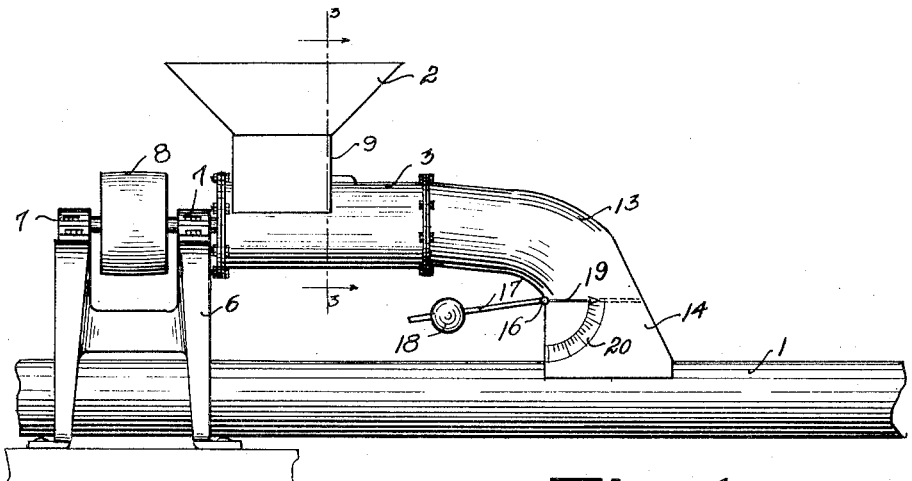
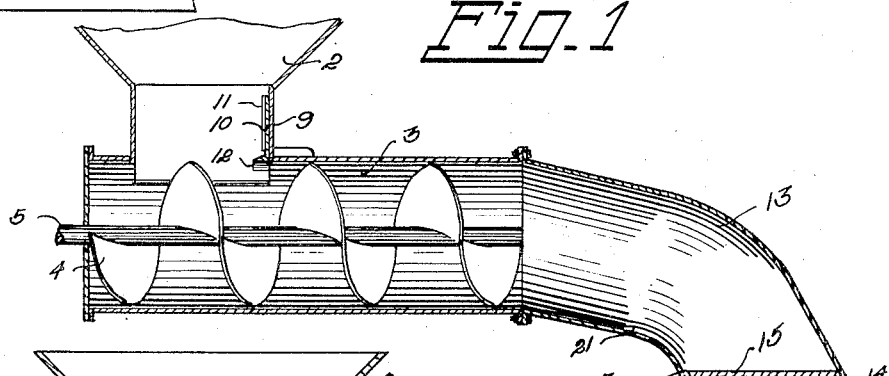
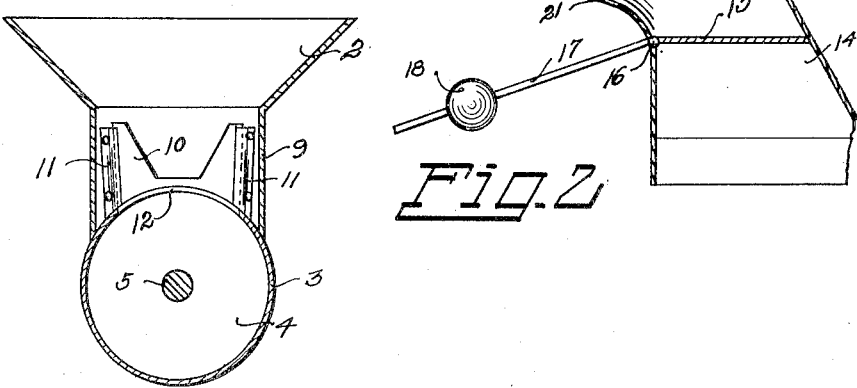

1,505,188

UNITED STATES PATENT OFFICE.

HENRY J. BURNS AND GLENN E. TOLLENAAR, OF SPOKANE, WASHINGTON.

FEED REGULATOR.

Application filed September 23, 1922. Serial No. 590,056.

*To all whom it may concern:*

Be it known that we, HENRY J. BURNS and GLENN E. TOLLENAAR, citizens of the United States, residing at Spokane, in Spokane County and State of Washington, have invented certain new and useful Improvements in Feed Regulators, of which the following is a specification.

Our present invention relates to improvements in pneumatic conveyers which form part of a dust collecting system in industrial plants for the removal of dust, chips, shavings and other refuse produced by the operation of the machinery of the plant. In the removal from the plant of such materials, which by their presence are injurious to health of the workmen and to the machinery of the plant, the injector method is employed in the device of the invention, in order to avoid passing the material through the fan or blower.

The primary object of the invention is the provision of a simple, compact, and efficient device for injecting the material, as saw-dust, into the main conveyer pipe of the collecting system. The collecting system includes several of these injecting or feeding devices for introducing the material to the main conveyer pipe, and each of the devices, of similar construction, is fashioned in such manner as to automatically maintain a seal or closure for the main pipe at the junction with the injector device, to prevent escape of and consequent reduction in pressure of the air currents passing through the conveyer pipe.

The invention consists in certain novel combinations and arrangements of parts as will be hereinafter more fully pointed out and claimed.

In the accompanying drawings we have illustrated one complete example of the physical embodiment of our invention wherein the parts are combined and arranged according to the best mode we have thus far devised for the practical application of the principles of our invention.

Figure 1 is a view in side elevation showing a portion of the main conveyer pipe of a pneumatic dust-collecting system having the injector or feeding device of our invention applied thereto.

Figure 2 is an enlarged, detail, longitudinal, vertical sectional view through the feeding and injecting devices of the invention.

Figure 3 is a transverse, vertical sectional view at line 3—3 of Figure 1.

The main conveyer pipe 1 of the collecting system is connected as usual with a blower or fan, at one end, and leads to and conveys the traveling material to the collector, from which the material may be deposited in a bin, car, cart, or otherwise disposed of in customary manner. These enumerated parts are not illustrated, but it will be understood that the blast of air, or air currents for conveying the material, are passing through the main pipe from left to right in Figure 1.

One feeding and injecting device is illustrated in the drawings, and it will be understood that a suitable or required number of these devices are used in a shop or plant for feeding the material and injecting it into the main pipe 1.

The feed hopper 2 is of proper size and shape and located in position convenient for access in order that the sawdust, shavings, chips, etc., of a plant, as for instance a saw-mill may be emptied or dumped therein. The hopper is mounted upon an elevated feed pipe 3, cylindrical in shape and disposed horizontally above the main pipe and adjacent thereto. The cylindrical feed pipe forms a casing for a screw conveyer 4 which has a supporting shaft 5, journaled in the rigid frame 6 in bearings 7 therefor. By means of the pulley 8 on the shaft and suitable driving connections including a belt (not shown) the screw conveyer is revolved within its casing or feed pipe 3 to convey the material to the right in Figures 1 and 2 as it is fed thereto from the hopper 2.

For the purpose of breaking or cutting into comparatively small pieces, the larger chips as they are fed through the hopper, the vertical wall 9 of the hopper, at the junction of the hopper and feed pipe, is provided with an adjustable slide plate 10, vertically disposed and retained in the two spaced guide plates 11 secured to the wall 9. At its lower end the adjustable slide plate is fashioned with a lateral projected cutting blade 12 conforming to the curve of the cylinder or pipe 3 and the periphery or spiral edge of the screw conveyer. Thus it will be apparent that the cutting blade may be adjusted with relation to the screw conveyer so that these parts will co-act to cut or break the larger chips as they are forced by the conveyer to the right in the feed pipe 3.

At one end of the feed pipe, a downwardly extending injector pipe 13 is located and attached, and the injector pipe is connected to the main pipe by means of a junction hood 14, which communicates with the main pipe through a top opening therein. It will be noted that the injector pipe increases in its cross sectional area in ratio to the distance from the feed pipe, and that the junction hood 14 is of such increased capacity as to permit the material, coming from the feed and injector pipes, to be expanded, in order that the dust may more readily enter the currents of air passing through the main conveyer pipe, and be carried or conveyed by the air blast in the main pipe.

Between the injector pipe and the junction hood is interposed a balanced feed gate 15, of proper size and shape to close the transverse area of the casing, and adapted to be depressed by a suitable weight or load of material. The gate is pivoted at 16 in the wall of the casing, and has a projecting, exterior arm 17 which carries an adjustable weight or balancing ball 18. And an indicator arm or pointer 19, exterior of the casing, on the end of the pivot bolt or pin 16, co-acts with a gage or scale 20 on the hood 14 to indicate the position of the gate.

The material, as it is fed through the hopper and passed by means of the screw conveyer through the feed pipe 3 is forced along the bottom portion 21 of the injector pipe and pushed on to the closed gate 15, which is held in closed position by means of the counterweight 18 on arm 17. When the accumulated material on the gate is sufficient in weight to overcome the weight of the ball 18, the gate is automatically depressed, permitting the material thereon to be drawn by suction from the pneumatic blast in the main pipe, into the currents of air passing through the main pipe, and the traveling material is thus conveyed to the dust collector. As long as the injected material is of sufficient weight to hold the gate depressed the material is injected into the main pipe, but should the weight of material decrease to the minimum point, the gate is at once and automatically closed by the action of the counterweight 18. At the portion 21 of the injector pipe a deposit of material is always present, even after the feed of material through the hopper and screw conveyer has ceased, but only a slight bulk of material will remain on the gate, after the weight of such bulk has decreased below the weight of the ball 18. The material is positively pushed and forced through the injector pipe and over the open gate by pressure from the screw conveyer, and the instant the feed of material decreases below the weight of the ball 18, the gate is automatically closed to prevent escape of air from the main pipe, or back pressure through the injector pipe.

In addition to cutting the larger chips and débris, the knife blade 12 prevents such chips from wedging between the edge of the screw conveyer and the walls of the feed pipe.

By means of the pointer 19 and its scale or gage 20 at the exterior of the hood, the relation of the counterweight and gate may be properly fixed, and the gate set for correct performance of its functions.

Having thus fully described our invention, what we claim as new and desire to secure by Letters Patent is:—

In an injecting device the combination with a feed pipe and a hopper having a free opening thereto, of a screw conveyer in the feed pipe, an adjustable device in the hopper and a blade rigid with said device having a lateral cutting edge conforming to and adapted to co-act with the screw conveyer.

In testimony whereof we affix our signatures.

HENRY J. BURNS.
GLENN E. TOLLENAAR.